United States Patent
Johnson (10) Patent No.: US 11,275,492 B1
(45) Date of Patent: Mar. 15, 2022

(54) PERSISTENCE STRATEGY FOR APPLICATIONS

(71) Applicant: InVisionApp Inc., New York, NY (US)

(72) Inventor: David Johnson, San Francisco, CA (US)

(73) Assignee: InVisionApp Inc., New York, NY (US)

( * ) Notice: Subject to any disclaimer, the term of this patent is extended or adjusted under 35 U.S.C. 154(b) by 371 days.

(21) Appl. No.: 15/953,165

(22) Filed: Apr. 13, 2018

(51) Int. Cl.
| | |
|---|---|
| *G06F 16/93* | (2019.01) |
| *G06F 3/04845* | (2022.01) |
| *H04L 67/10* | (2022.01) |
| *G06F 16/28* | (2019.01) |

(52) U.S. Cl.
CPC ........ *G06F 3/04845* (2013.01); *G06F 16/285* (2019.01); *G06F 16/93* (2019.01); *H04L 67/10* (2013.01)

(58) Field of Classification Search
CPC .... G06F 3/04845; G06F 16/285; G06F 16/93; H04L 67/10; G06T 13/00
See application file for complete search history.

(56) References Cited

U.S. PATENT DOCUMENTS

| | | | | |
|---|---|---|---|---|
| 5,987,232 | A * | 11/1999 | Tabuki | G06F 21/31 709/229 |
| 6,658,417 | B1 * | 12/2003 | Stakutis | G06F 16/10 |
| 7,353,248 | B1 * | 4/2008 | Kirkpatrick | H04L 67/2819 707/999.1 |
| 10,453,179 | B1 * | 10/2019 | Karppanen | H04N 19/34 |
| 2008/0205796 | A1 * | 8/2008 | Jonsson | G06T 11/60 382/311 |
| 2011/0107320 | A1 * | 5/2011 | Flisakowski | G06F 16/50 717/170 |
| 2017/0220546 | A1 * | 8/2017 | Codrington | G06F 3/0484 |
| 2018/0365785 | A1 * | 12/2018 | Boss | G06Q 10/063112 |
| 2019/0333117 | A1 * | 10/2019 | Lee | G06Q 50/01 |

\* cited by examiner

*Primary Examiner* — Vaishali Shah
(74) *Attorney, Agent, or Firm* — McDermott Will & Emery LLP (57) ABSTRACT

A method including combining multiple mutations of a document into a mutation cluster based on a contextual purpose for the mutations is provided. The method includes forming a proposal for modifying the document based on the mutation cluster, transmitting the proposal to a server for validation, storing the proposal in a proposal log when the server validates the proposal, and redoing or undoing the mutation cluster on the document upon an input from a user. A system and a non-transitory storage medium including instructions to perform the above method are also provided.

19 Claims, 8 Drawing Sheets

PERSISTENCE STRATEGY FOR APPLICATIONS

BACKGROUND

Field

The present disclosure generally relates to devices and systems for grouping document mutations in the context of a user intended purpose within an application installed in a client device.

Description of the Related Art

Editing tools in electronic content creating applications typically provide a high degree of granularity to store and concatenate user actions. However, the degree of granularity becomes detrimental for storage capacity and latency of communication data streams of a computer, especially when multiple users participate in a networked collaboration to create a document. Moreover, storing a large set of concatenated actions with a high degree of granularity may be undesirable to a user, who may prefer to quickly access or share with other users a previous version of the document, or to repeat a large scale mutation multiple times.

SUMMARY

In one embodiment of the present disclosure, a computer-implemented method is described for combining multiple mutations of a document into a mutation cluster based on a contextual purpose for the mutations. The computer-implemented method includes forming a proposal for modifying the document based on the mutation cluster, transmitting the proposal to a server for validation, storing the proposal in a proposal log when the server validates the proposal, and redoing or undoing the mutation cluster on the document upon an input from a user.

According to one embodiment, a system is described that includes one or more processors and a memory coupled to the one or more processors, the memory including instructions that, when executed by the one or more processors, cause the one or more processors to combine multiple mutations of a document into a mutation cluster based on a contextual purpose for the mutations to identify multiple classes of mutations of the document, wherein the classes of mutations of the document comprise at least one of a translation, a rotation, and a resizing of a geometric shape in the document. The one or more processors execute instructions to form a proposal for modifying the document based on the mutation cluster, and to transmit the proposal to a server for validation. The one or more processor also execute instructions to store the proposal in a proposal log when the server validates the proposal, and to redo or undo the mutation cluster on the document upon an input from a user.

According to one embodiment, a non-transitory, computer readable medium is described that includes instructions, which when executed by one or more processors, cause a computer to perform a method for combining multiple mutations of a document into a mutation cluster based on a contextual purpose for the mutations. The mutations of the document comprise at least one of a translation, a rotation, and a resizing of a geometric shape in the document, and forming a proposal for modifying the document based on the mutation cluster. The method also includes transmitting the proposal to a server for validation, storing the proposal in a proposal log when the server validates the proposal, redoing or undoing the mutation cluster on the document upon an input from a user, and sharing the document with multiple users for a collaboration hosted by the server.

In yet other embodiment, a system is described that includes a means for storing commands and a means for executing the commands causing the system to perform a method that includes instructions, which when executed by one or more processors, cause the system to perform a method for combining multiple mutations of a document into a mutation cluster based on a contextual purpose for the mutations, and forming a proposal for modifying the document based on the mutation cluster. The method also includes transmitting the proposal to a server for validation, storing the proposal in a proposal log when the server validates the proposal, and redoing or undoing the mutation cluster on the document upon an input from a user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "document" may be used, for example, in reference to a digital file that is composed of one or more media elements of different types (text, image, video, audio, etc.). A document can be a single picture or a single video file, or a composite of multiple pictures, video files, text, and the like (e.g., a web site template, a poster, or an advertisement).

The present disclosure relates to methods for grouping user actions in the context of user intended purposes within a document handled by an application. In some embodiments, the application is a design tool where the user can create and edit graphics components in a design (e.g., a webpage, an advertisement poster, and the like). Method and systems as disclosed herein may be used in the realm of content creation tools and applications.

Embodiments as disclosed herein provide a technical solution to a technical problem arising in the realm of computer technology, namely the problem of handling multiple mutations while editing a document in a content creative application, which causes processing bandwidth constrains, and reduces battery efficiency. Methods and tools as disclosed herein resolve the above problem by providing a design engine that combines multiple mutations into an atomic mutation cluster based on a contextual purpose for the mutations. Accordingly, the user may recover a previous logical state in the document by undoing the mutation cluster.

In some embodiments, a design engine as disclosed herein collapses a high-volume stream of related events or mutations into a more discrete, merged, less verbose but functionally equivalent sequence of mutation clusters that are contextual to user intent. In some embodiments, each mutation cluster is associated with a class of document transformations representing a specific user intent, thus simplifying the editing tasks for the user, either for undoing certain operations, or redoing other operations multiple times.

Embodiments as disclosed herein include more than simply appending streams of changes into classified sets according to user-context. In addition, some embodiments are configured to merge and reduce an input stream of user actions into an equivalent output stream of user actions that includes mutation clusters, but represented (the output stream of user actions) by a smaller amount of data. The mutation clusters may also be grouped by the classifications sets.

The subject system provides several advantages, including a more efficient data transmission of a reduced stream of mutation clusters over a network. Also, embodiments as disclosed herein enable a more efficient remote support for the content editing application installed in the client device due to the shortened data stream exchange between the remote server and the client device. Also, embodiments as disclosed herein enable synchronization schemes and document persistence when multiple users collaborate on a document over a network.

The proposed solution further provides improvements to the functioning of the computer itself, because it reduces the usage of storage space during execution of the content creating application. The proposed solution also improves the functioning of the computer because it reduces the latency in communication protocols by a communications module coupled with a remote design engine hosting the content creating application.

Example System Architecture

Figure 1:
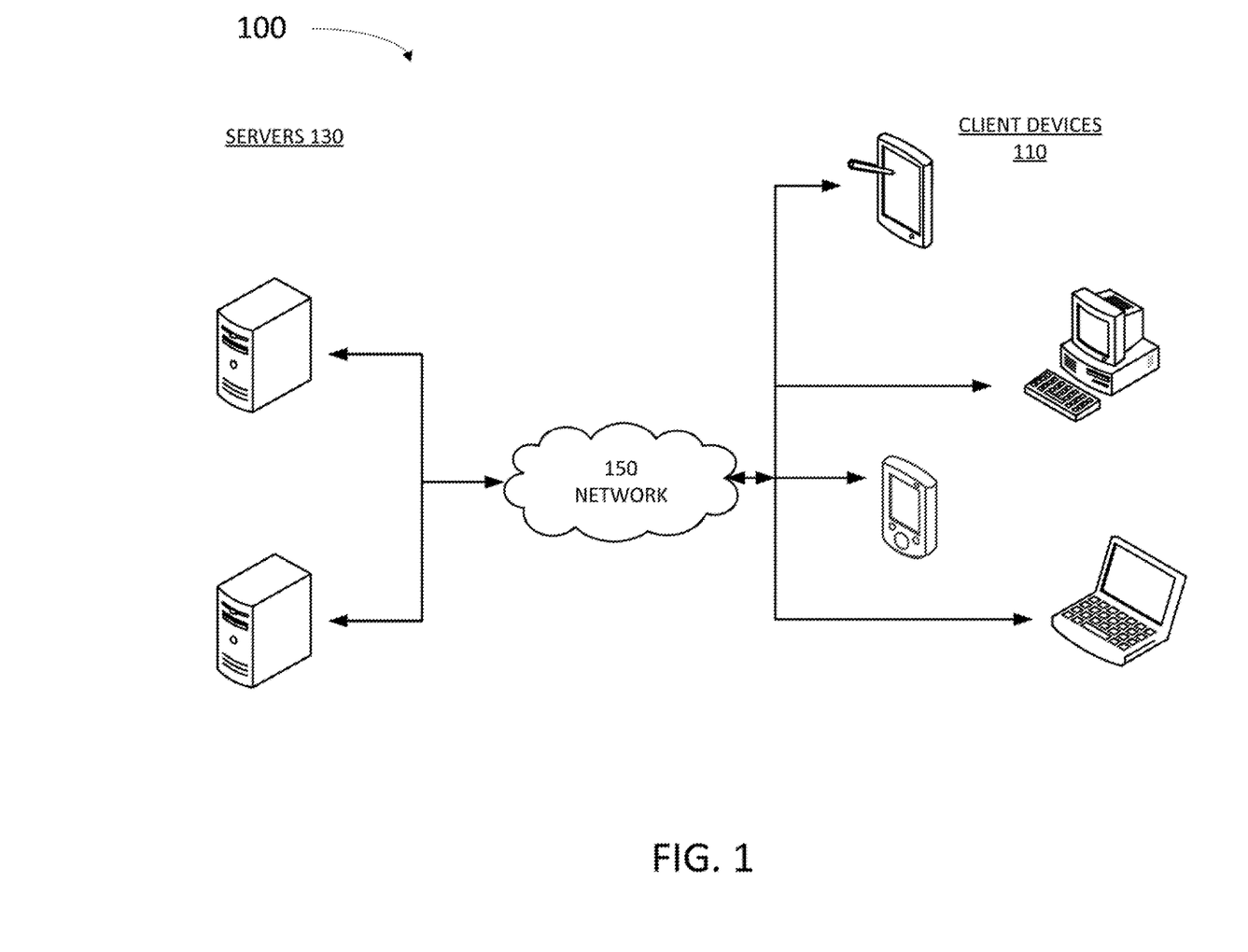
FIG. 1 illustrates an example architecture suitable in a persistence strategy for a user document in a client device, according to some embodiments.

FIG. 1 illustrates an example architecture 100 for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to perform client device 110 from a third party website. The target image may be retrieved from a license history of the user, which may be stored in a proposal log in a memory of the server hosting the collaborative application. For purposes of load balancing, multiple servers 130 can host memories including instructions to one or more processors, and multiple servers 130 can host a proposal log and the document database.

Servers 130 may include any device having an appropriate processor, memory, and communications capability for hosting the proposal log, the image database, and a collaboration engine. The collaboration engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the collaboration engine and the proposal log on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
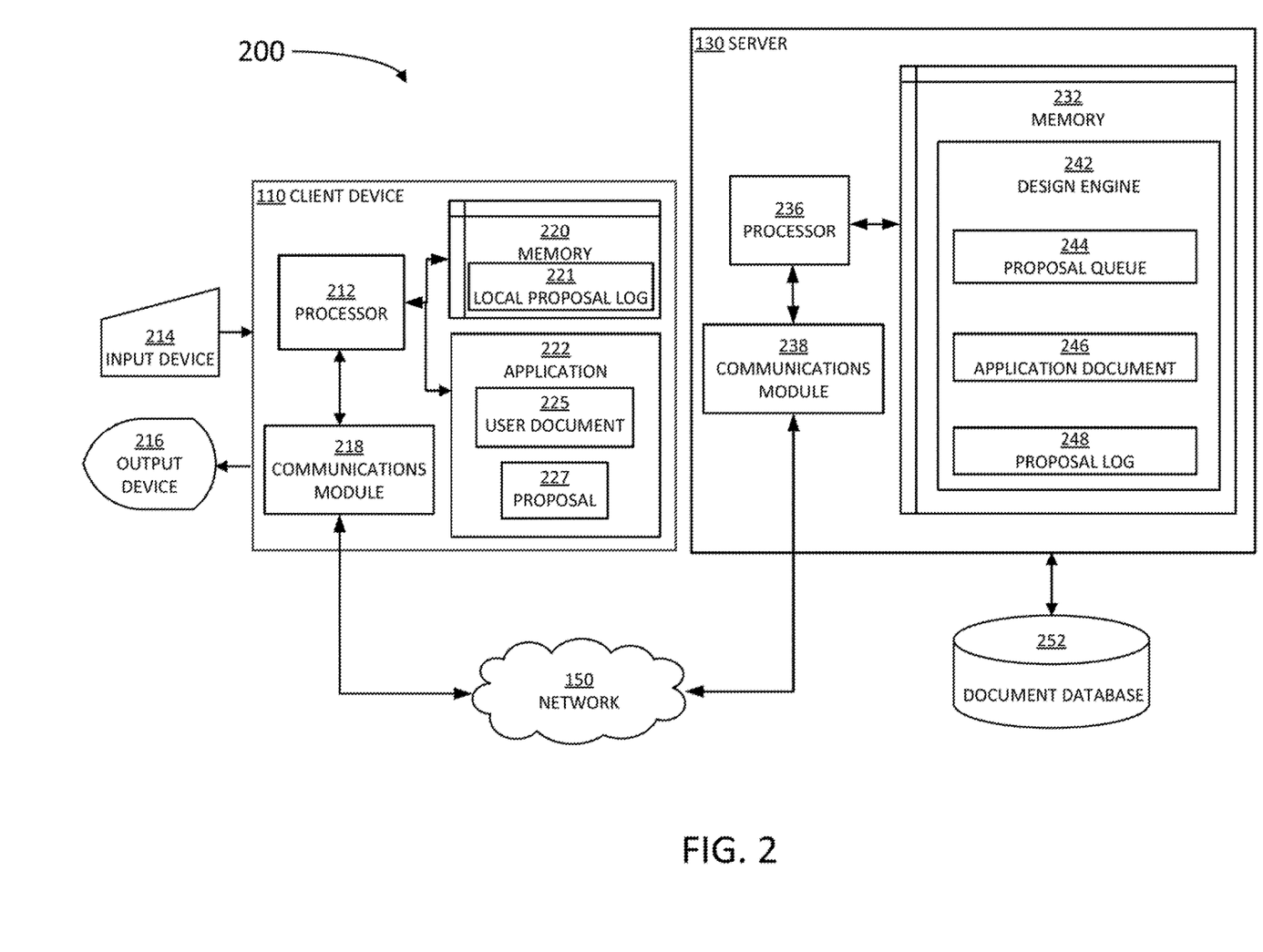
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Input device 214 may include a mouse, a keyboard, a touchscreen display, or any combination of the above, and the like. Output device 216 may include a display, a speaker, an antenna, or any combination of the above, and the like. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes a design engine 242 that stores proposal 227 provided by client device 110 in a proposal queue 244. Design engine 242 uses proposals 227 in proposal queue 244 to update application document 246, and stores the proposals in proposal log 248. In some embodiments, server 130 may store application document 246 in a document database 252. A user may access design engine 242 through an application 222 or a web browser installed in client device 110. Accordingly, application 222 may be installed by server 130 and perform scripts and other routines provided by server 130. Further, in some embodiments. Application 222 may be a content creating application such that a user of client device 110 may access and edit a user document 225. In some embodiments, a version of user document 225 is stored in memory 232 of server 130, more specifically in design engine 242, as an application document 246. Execution of application 222 and activation of user document 225 may be controlled by a processor 212 in client 110.

Application 222 creates a proposal 227, which may include one or more mutation clusters representing a change or modification to user document 225. In some embodiments, proposal 227 includes the context of the user intent when changing or modifying user document 225. In that regard, a mutation cluster in proposal 227 may include actions by the user that represent a unity of purpose for modifying the document. In some embodiments, memory 220 may include a local proposal log 221 to store one or more proposals 227 created within application 222. In some embodiments, local proposal log 221 is stored in a volatile memory, e.g., Random Access Memory (RAM), dynamic RAM (DRAM), static RAM (SRAM), or any combination of the above. Accordingly, in some embodiments local proposal log 221 may be lost from memory 220 when the client device 110 stops application 222. In some embodiments local proposal log 221 is stored in a circuit in memory 220 that is part of a non-volatile memory (e.g., a flash memory, a solid state memory, hard disk, magnetic memory, tape, and the like), such that when processor 212 activates application 222 after a shutdown, the user may recover prior mutations in user document 225.

In some embodiments, memory 232 stores a proposal queue 244 that includes multiple proposals 227 for modifying user document 225. Proposals 227 in proposal queue 244 are provided by multiple client devices 110 through application 222 via communications module 218 and received in server 130 via communications module 238. Application document 246 is a synchronized version of user document 225, after the latest proposal 227 in proposal queue 244 has been promoted into a fact by design engine 242.

In certain aspects, design engine 242 evaluates proposal 227 from client device 110, together with multiple other proposals from other client devices, cached in a proposal queue 244. Synchronization engine 242 may determine that proposal 227 has no conflict with other proposals and accept proposal 227. Accordingly, design engine 242 applies the changes and modifications to application document 246 and stores the proposal in a proposal log 248. Further, in some embodiments, server 130 may re-broadcast proposal 227 to other users that may be collaborating in application document 246, or that may be viewing, downloading, or downstreaming the document.

A user of client device 110 having an application 222 installed by, and registered with, server 130, may have a personal account in document database 252, storing a stack of facts 246 from proposal log 248. Proposal log 248, design engine 242, and document database 252 may be part of the same memory 232 in server 130. In some embodiments, design engine 242 and at least one of document database 252 may be hosted in a different server that is accessible by server 130.

Figure 3:
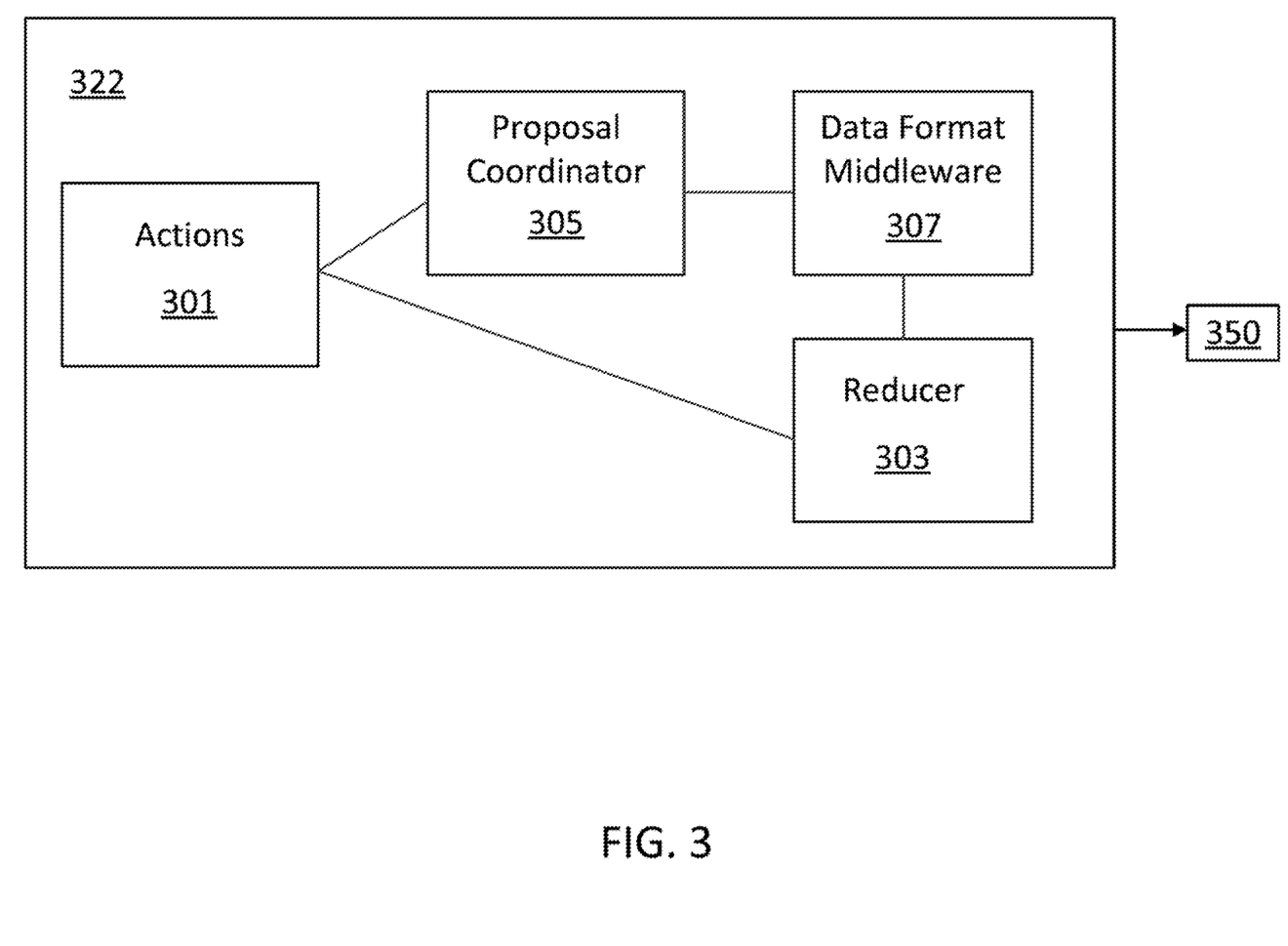
FIG. 3 illustrates a block diagram of a content creating application, according to some embodiments.

FIG. 3 illustrates a block diagram of a content creating application 322 (e.g., application 222), according to some embodiments. Actions block 301 receives the mutations executed by the user on the document. Accordingly, actions block 301 may be coupled to an input device with which the user inserts edits into the document (e.g., input device 214).

In some embodiments, actions block 301 buffers multiple mutations until at least one or more user intended actions may be identified from the context of the mutations. A reducer block 303 is configured to receive an input document state, apply a proposal (of bundled modifications or "mutations"), and returns a new document in an output state, when content creating application 322 is requested. In some embodiments, when a clearly identified user-intention is detected, actions block 301 provides the multiple mutations to a proposal coordinator block 305. In some embodiments, a proposal coordinator block 305 aggregates, buffers and reduces the user generated stream of action sequences, and is the arbiter deciding, based on an application-specific classification logic and stream context, when to emit the reduced or combined mutation clusters.

Proposal coordinator block 305 evaluates the mutations provided by actions block 301 based a contextual purpose for the mutations. Accordingly, in some embodiments proposal coordinator block 305 identifies multiple classes of mutations of the document (e.g., a translation, a rotation, and a resizing of a geometric shape in the document). In some embodiments, block 305 selects, from each of the states of the document before and after each mutation, a final state of the document when a difference with an initial state of the document matches a contextual purpose. In some embodiments, proposal coordinator block 305 may be configured to select the initial state of the mutation cluster to be a final state of a previous mutation cluster. In some embodiments proposal coordinator block 305 is configured to bundle a plurality of mutation clusters associated with the document, wherein each proposal defines an initial document state and a final document state, with no intervening document version. A proposal in proposal coordinator block 304 may also include an "inverse" mutation bundle which, when applied to the document in the final state of the "forward" bundle, would revert the document to the initial document state. This strategy avoids the capture and inclusion of snapshots of the initial state (which could occupy large memory space) in the proposal.

In some embodiments, a proposal includes an initial document state and a final document state, and proposal coordinator 305 is configured to display the initial document state and the final document state in a display of the client device, for the user (e.g., output device 216). A data format middleware block 307 receives one or more proposals (e.g., a proposal stream) from proposal coordinator 305 and forwards a reduced stream 350 back to the application 222, to memory 220 for storage in local proposal log 221, or to a remote server via a communications module (e.g., communications module 218, server 130).

Figure 4A:
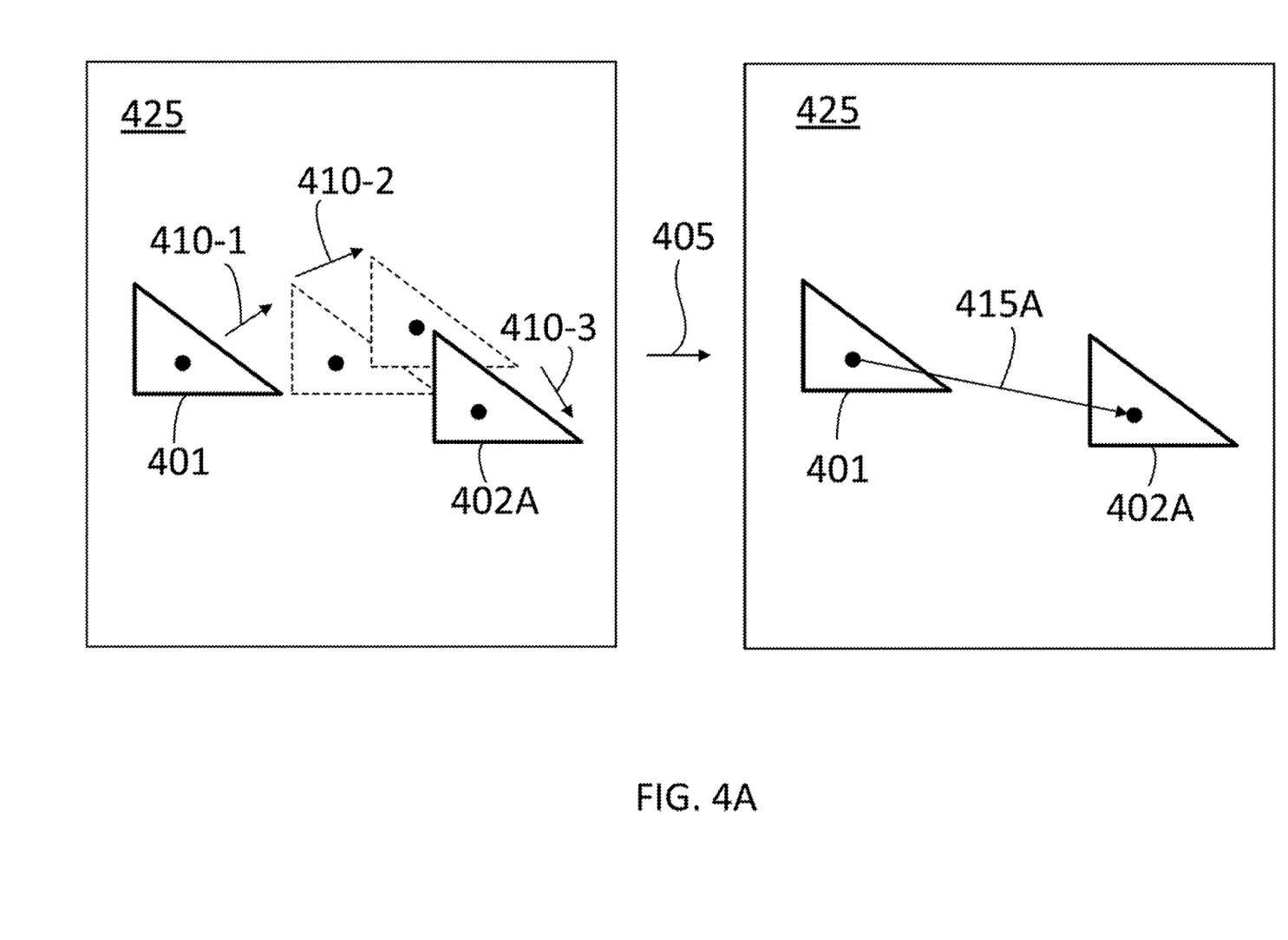
FIG. 4A illustrates a translation group in a persistence strategy for a user document, according to some embodiments.
Figure 4B:
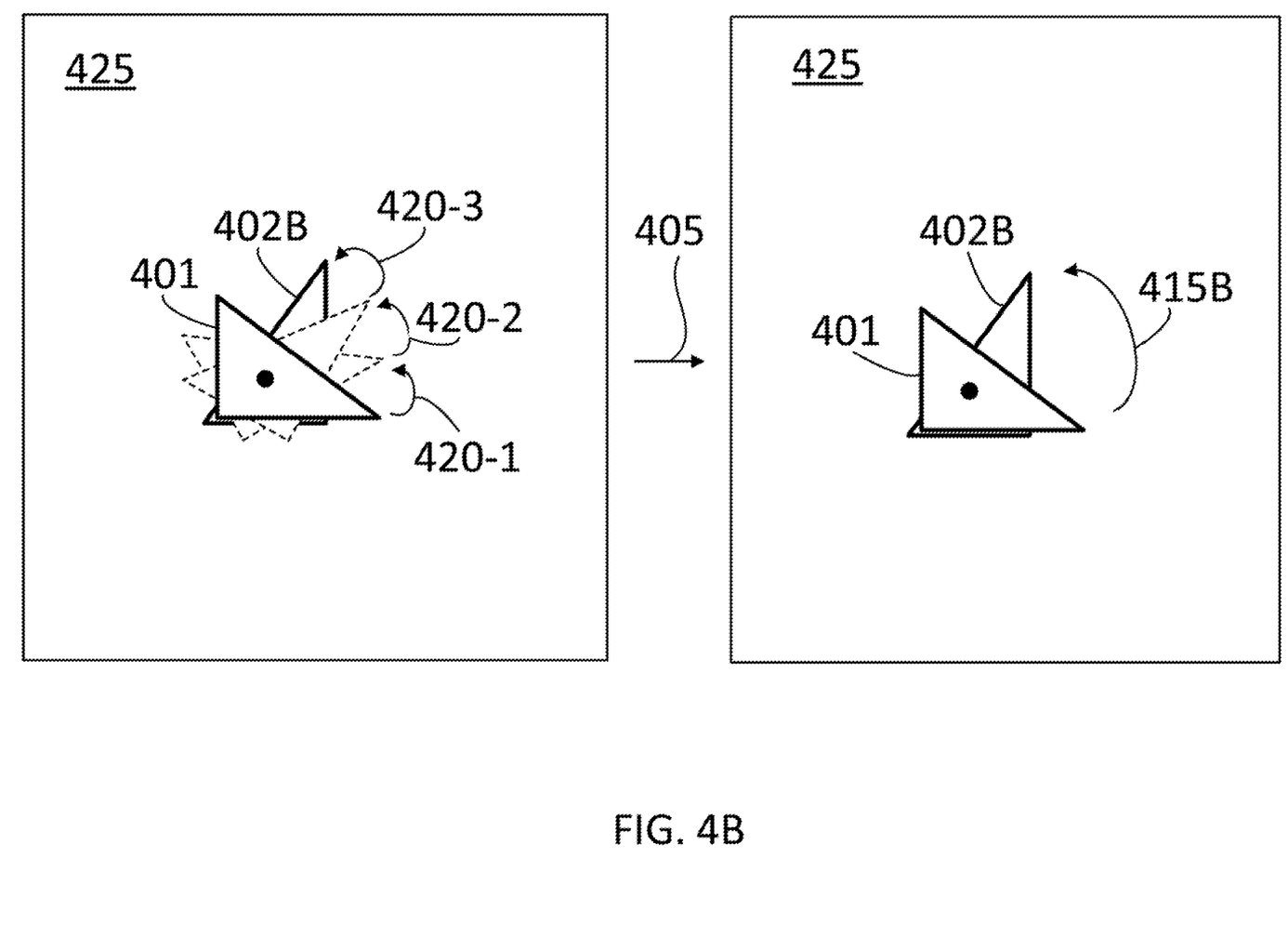
FIG. 4B illustrates a rotation group in a persistence strategy for a user document, according to some embodiments.
Figure 4C:
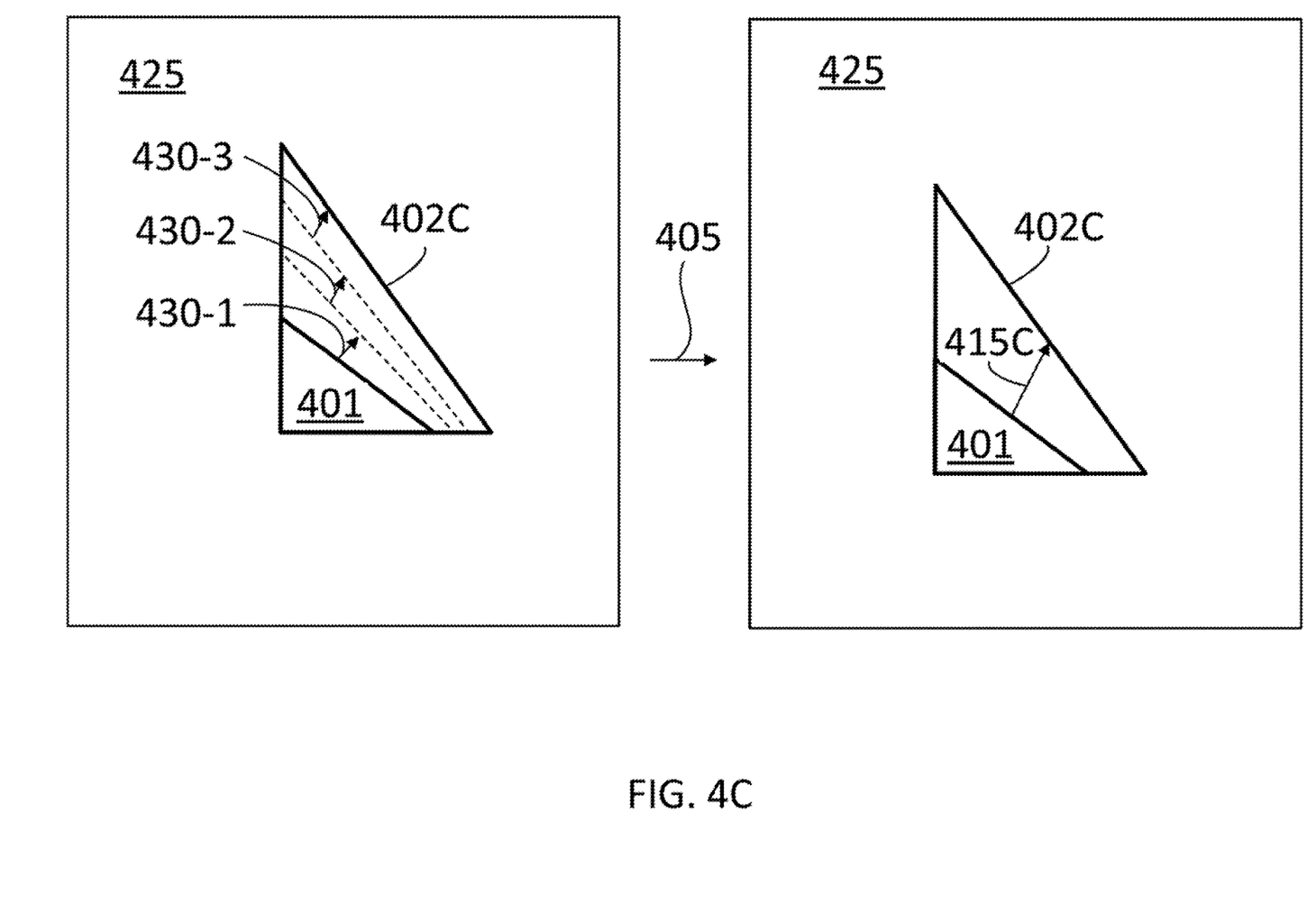
FIG. 4C illustrates a resize group in a persistence strategy for a user document, according to some embodiments.

FIGS. 4A-C illustrate examples of series of mutations including transforming a shape (e.g. translate, resize, rotate a triangle) via the action of an input device (e.g., a mouse, pointer, or finger on a screen drag or gesture) in a user document 425. The triangle may be in an initial state 401, and the user may nudge, rotate, and resize the triangle into a final state 402A, 402B, or 402C (hereinafter, collectively referred to as "final states 402"), respectively. Accordingly, a proposal coordinator 405 (e.g., proposal coordinator 305) processes and reduces the stream of actions to provide real-time visual feedback to the user. In some embodiments, a proposal coordinator (e.g., proposal coordinator 305) emits a single, equivalent action 415A, 415B, and 415C (hereinafter, collectively referred to as "mutation clusters 415"), respectively, at the end of the input stream of actions. In some embodiments, mutation clusters 415 are bundled to include a set of changes that when applied to an initial state, mutate the document to the final state (e.g., initial state 401 and final states 402), with no states in between. Accordingly, in some embodiments an undo operation for mutation clusters 415 recovers initial state 401 from any one of final states 402. In some embodiments, a mutation cluster 415 that is output from the proposal coordinator may or may not contain the same set and number of input mutations it received.

FIG. 4A illustrates translations 410-1, 410-2, and 410-3 (hereinafter, collectively referred to as "translations 410") in a persistence strategy for a user document, according to some embodiments. More generally, translation group 410 may include any number of translations 410, regardless of the amplitude of the displacement (e.g., from a simple nudge to a cross-screen displacement). Accordingly, in some embodiments mutation cluster 415A may include a single translation result, from hundreds of input translations 410 received.

FIG. 4B illustrates rotations 420-1, 420-2, and 420-3 (hereinafter, collectively referred to as "rotations 420") in a persistence strategy for a user document, according to some embodiments. More generally, rotation group 420 may include any number of rotations 420, in any direction (e.g., clockwise or counterclockwise).

FIG. 4C illustrates resize mutations 430-1, 430-2, and 430-3 (hereinafter, collectively referred to as "resize group 430") in a persistence strategy for a user document, according to some embodiments. More generally, resize group 430 may include any number of resize mutations 430.

In some embodiments, application 222 selects initial state 401 and final states 402 based on a group classification of the mutations implemented in user document 425. Accordingly, when the user performs a series of translations 410 followed by a series of rotations 420 and or a series of resizing mutations 430 (in any order between translations 410, rotations 420, and resizing mutations 430), initial state 401 and final states 402 may be selected such that between the initial and final states only mutations of one class are performed (e.g., each mutation cluster includes either translations, or rotations, or resize mutations). Accordingly, the final state 402 of translations 410 may be the initial state 401 of rotations 420, and the final state of rotations 420 may be the initial state of resize mutations 430.

Figure 5:
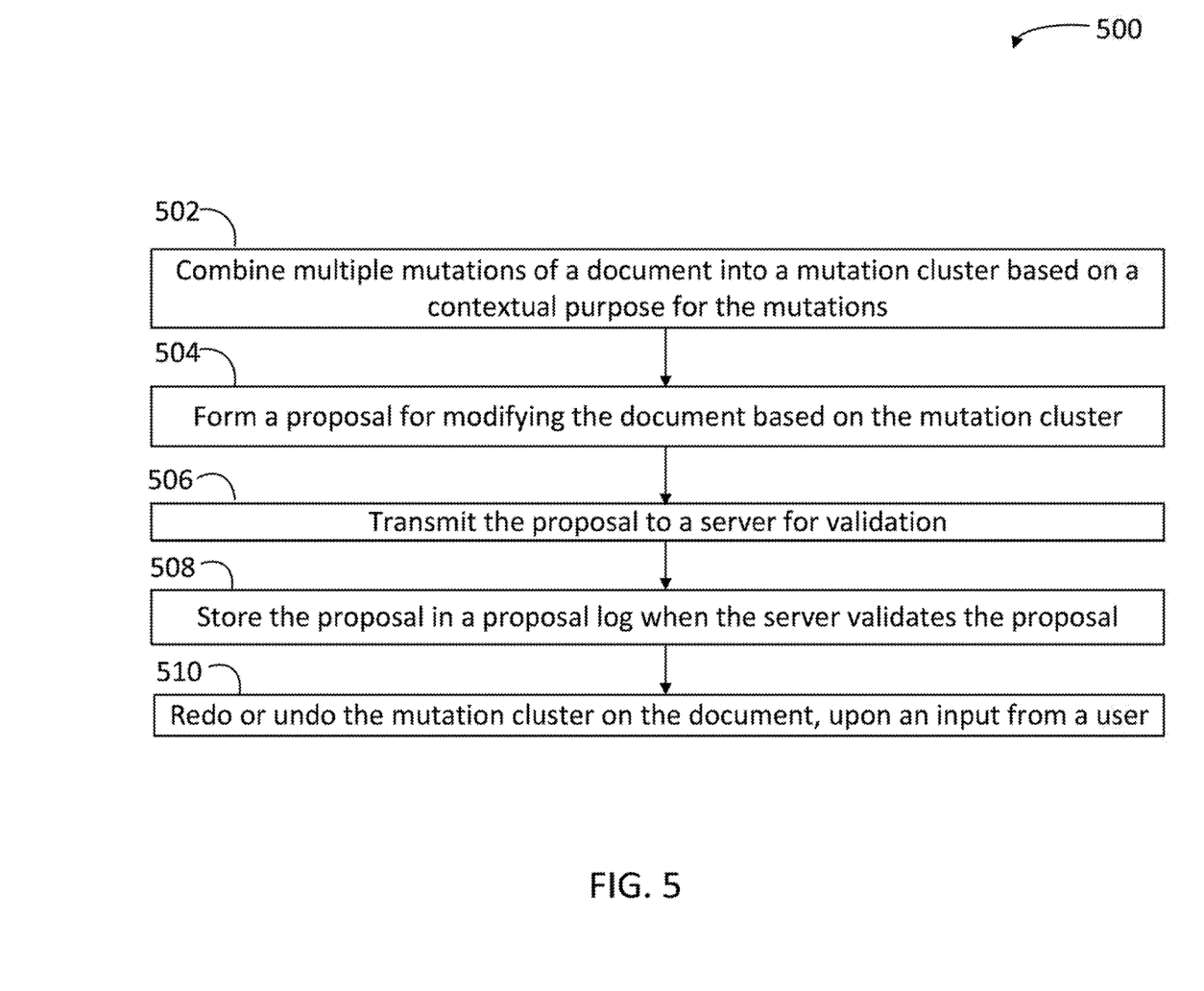
FIG. 5 is a flow chart illustrating steps in a method for grouping document mutations in a persistence strategy for a user document, according to some embodiments.

FIG. 5 is a flow chart illustrating steps in a method 500 for collaborating with one or more other users on a document, using one or more devices, according to some embodiments. Method 500 may be performed at least partially by a user with any one of a plurality of client devices (e.g., any one of servers 130 and any one of client devices 110), and communicating with any one of a plurality of network servers hosting a collaborative production of a document (e.g., application document 246). The client devices may be handled by a user, wherein the user may be registered to a private account with the server, or may be a visitor to the server website or logged in a server application and an application element installed in the client device (e.g., application 222). At least some of the steps in method 500 may be performed by a computer having a processor executing commands stored in a memory of the computer (e.g., processors 212 and 236, memories 220 and 232). Further, steps as disclosed in method 500 may include retrieving, editing, and/or storing files in a database that is part of, or is communicably coupled to, the computer, using, inter-alia, a collaboration engine (e.g., design engine 242). The database may include any one of a document database and a proposal log (e.g., document database 252, proposal log 248). Methods consistent with the present disclosure may include at least some, but not all of, the steps illustrated in method 500, performed in a different sequence. Furthermore, methods consistent with the present disclosure may include at least two or more steps as in method 500 performed overlapping in time, or almost simultaneously.

Step 502 includes combining multiple mutations of a document into a mutation cluster based on a contextual purpose for the mutations. In some embodiments, step 502 includes identifying multiple classes of mutations of the document, wherein the classes of mutations of the document comprise at least one of a translation, a rotation, and a resizing of a geometric shape in the document. In embodiments consistent with the present disclosure there may be many types of mutation classifications, beyond translate/rotate/resize. Furthermore, in some embodiments, the mutation classifications may extend beyond application to geometric shapes (e.g. text attributes, font selection, image layer opacity, interaction duration and easing equations, and the like). In some embodiments, step 502 includes selecting a final state of the document when a difference with an initial state of the document matches the contextual purpose. In some embodiments, step 502 includes selecting an initial state of the mutation cluster to be a final state of a previous mutation cluster.

Step 504 includes forming a proposal for modifying the document based on the mutation cluster. In some embodiments, step 504 includes bundling a plurality of mutation clusters associated with the document, wherein each proposal defines an initial document state and a final document state, with no intervening document version. In some embodiments, the proposal includes an initial document state and a final document state, and step 504 further includes displaying the initial document state and the final document state in a client device for the user.

Step 506 includes transmitting the proposal to the server, for validation. In some embodiments, step 506 includes storing the proposal in a local memory.

Step 508 includes storing the proposal in a proposal log when the server validates the proposal. In some embodiments, step 508 includes storing the proposal in a sequence of proposals in a local, non-volatile memory.

Step 510 includes redoing or undoing the mutation cluster on the document upon an input from a user. In some embodiments, step 510 includes retrieving the mutation cluster from a local, non-volatile memory upon accessing the document with an application. In some embodiments, step 510 includes sharing the document with multiple users for a collaboration hosted by the server.

Hardware Overview

Figure 6:
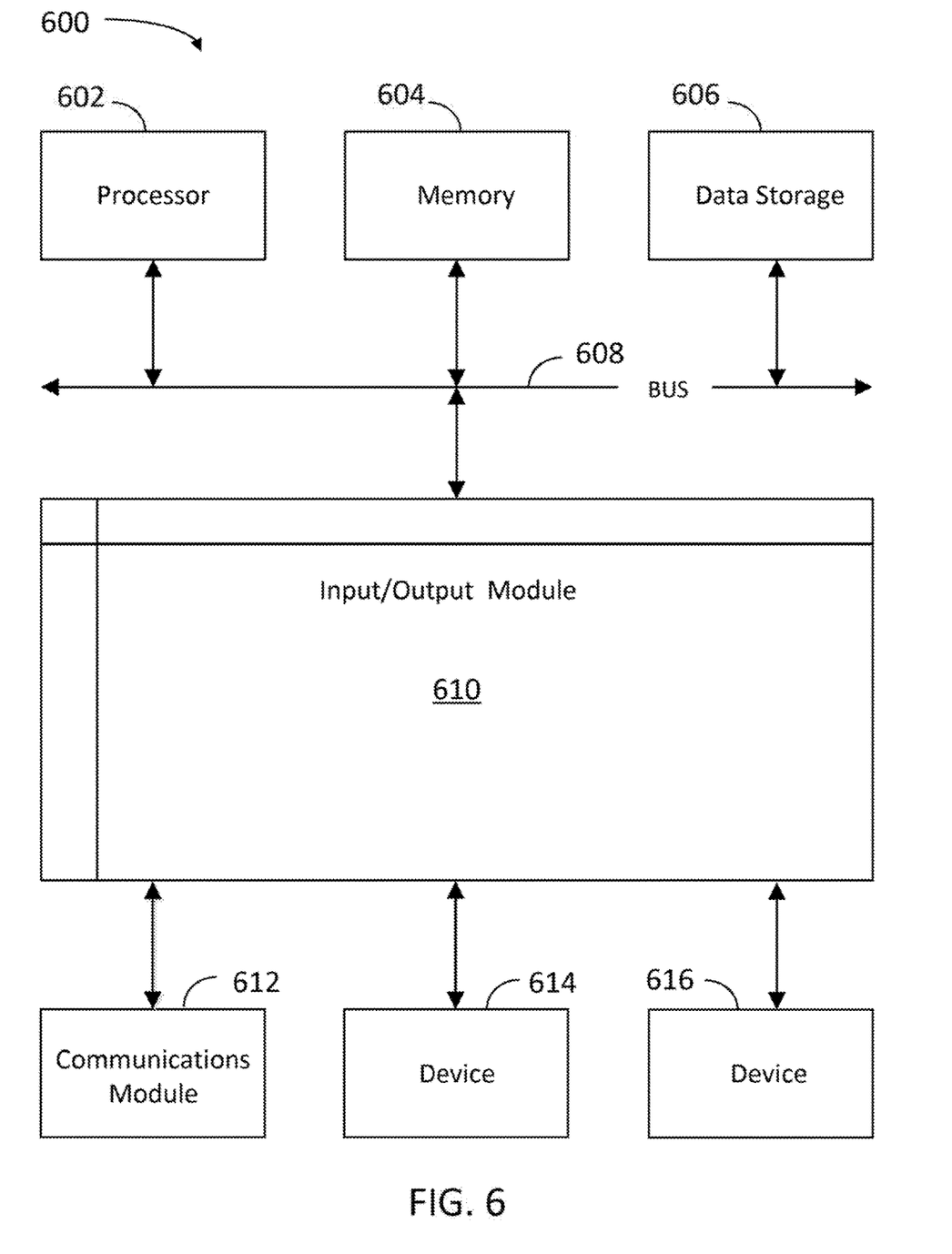
FIG. 6 is a block diagram illustrating an example computer system with which the client and server of FIGS. 1 and 2 and the methods of FIG. 5 can be implemented.

FIG. 6 is a block diagram illustrating an exemplary computer system 600 with which the client 110 and server 130 of FIGS. 1 and 2, and the methods of FIG. 5 can be implemented. In certain aspects, the computer system 600 may be implemented using hardware or a combination of software and hardware, either in a dedicated server, or integrated into another entity, or distributed across multiple entities.

Computer system 600 (e.g., client 110 and server 130) includes a bus 608 or other communication mechanism for communicating information, and a processor 602 (e.g., processors 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 (e.g., communications modules 218 and 238) include networking interface cards, such as Ethernet cards and modems. In certain aspects, input/output module 610 is configured to connect to a plurality of devices, such as an input device 614 (e.g., input device 214) and/or an output device 616 (e.g., output device 216). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as an LCD (liquid crystal display) monitor, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires forming bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    combining multiple mutations of a document into a mutation cluster based on a contextual purpose for the mutations, wherein the mutation cluster comprises a selected sequence of mutations in a mutation stream performed by a first user between an initial state of the document and a final state of the document, and the selected sequence of mutations in the mutation stream comprises mutations of a single class, the single class including only mutations of one type of geometric modification of an object in the document;
    forming a proposal for modifying the document based on the mutation cluster;
    transmitting the proposal to a server for validation;
    storing the proposal in a proposal log when the server validates the proposal; and
    applying each mutation according to the selected sequence of mutations in the mutation cluster on the document upon an input from the first user, to display, for a second user, a real-time visual feedback on a graphic user interface based of the final state of the document, wherein each mutation cluster is replaced by a single, equivalent geometric modification including the initial state of the document and the final state of the document only, from the selected sequence of mutations of a same class, wherein the same class comprises at least one of a translation class, a rotation class, and a resizing of a specific geometric shape class.

2. The computer-implemented method of claim 1, wherein combining the multiple mutations of the document into the mutation cluster comprises selecting the final state of the document when a difference with the initial state of the document matches the contextual purpose.

3. The computer-implemented method of claim 1, wherein combining the multiple mutations of the document into the mutation cluster comprises selecting an initial state of the mutation cluster to be a final state of a previous mutation cluster.

4. The computer-implemented method of claim 1, wherein forming the proposal comprises bundling a plurality of mutation clusters associated with the document, wherein each proposal defines the initial state of the document and the final state of the document, with no intervening document version.

5. The computer-implemented method of claim 1, wherein the proposal comprises the initial state of the document and the final state of the document, further comprising displaying the initial state of the document and the final state of the document in a client device for the first user.

6. The computer-implemented method of claim 1, wherein transmitting the proposal to a server for validation comprises storing the proposal in a local memory.

7. The computer-implemented method of claim 1, wherein storing the proposal in the proposal log comprises storing the proposal in a sequence of proposals in a local, non-volatile memory.

8. The computer-implemented method of claim 1, wherein redoing or undoing the mutation cluster on the document upon an input from the first user comprises retrieving the mutation cluster from a local, non-volatile memory upon accessing the document with an application.

9. The computer-implemented method of claim 1, further comprising sharing the document with multiple users for a collaboration hosted by the server.

10. A system comprising:
one or more processors; and
a memory coupled to the one or more processors, the memory including instructions that, when executed by the one or more processors, cause the one or more processors to:
combine multiple mutations of a document into a mutation cluster based on a contextual purpose for the mutations to identify multiple classes of mutations of the document, wherein the mutation cluster comprises a selected sequence of mutations in a mutation stream performed by a first user between an initial state of the document and a final state of the document, and the selected sequence of mutations in the mutation stream comprises mutations of a single class, the single class including only mutations of one type of geometric modification of an object in the document;
form a proposal for modifying the document based on the mutation cluster;
transmit the proposal to a server for validation;
store the proposal in a proposal log when the server validates the proposal; and
apply each mutation according to the selected sequence of mutations in the mutation cluster on the document upon an input from the first user, to display, for a second user, a real-time visual feedback on a graphic user interface based of the final state of the document, wherein each mutation cluster is replaced by a single, equivalent geometric modification including the initial state of the document and the final state of the document only, from the selected sequence of mutations of a same class, wherein the same class comprises at least one of a translation class, a rotation class, and a resizing of a specific geometric shape class.

11. The system of claim 10, wherein the one or more processors further executes instructions to share the document with multiple users for a collaboration hosted by the server.

12. The system of claim 10, wherein to form a proposal the one or more processors further executes instructions to bundle a plurality of mutation clusters associated with the document, wherein each proposal defines the initial state of the document and the final state of the document, with no intervening document version.

13. The system of claim 10, wherein the proposal comprises the initial state of the document and the final state of the document, and wherein the one or more processors further executes instructions to display the initial state of the document and the final state of the document in a client device for the first user.

14. The system of claim 10, wherein to store the proposal in the proposal log the one or more processors further execute instructions to store the proposal in a sequence of proposals in a local, non-volatile memory.

15. The system of claim 10, wherein to redo or undo the mutation cluster on the document upon an input from the first user the one or more processors further execute instructions to retrieve the mutation cluster from a local, non-volatile memory upon accessing the document with an application.

16. The system of claim 10, further comprising sharing the document with multiple users for a collaboration hosted by the server.

17. A non-transitory, computer readable medium storing instructions which, when executed by a processor, cause a computer to perform a method, the method comprising:
combining multiple mutations of a document into a mutation cluster based on a contextual purpose for the mutations, wherein the mutation cluster comprises a selected sequence of mutations in a mutation stream performed by a first user between an initial state of the document and a final state of the document, and the selected sequence of mutations in the mutation stream comprises mutations of a single class, the single class including only mutations of one type of geometric modification of an object in the document;
forming a proposal for modifying the document based on the mutation cluster;
transmitting the proposal to a server for validation;
storing the proposal in a proposal log when the server validates the proposal;
applying each mutation according to the selected sequence of mutations in the mutation cluster on the document upon an input from the first user; and
sharing the document with multiple users for a collaboration hosted by the server, to display, for a second user, a real-time visual feedback on a graphic user interface based of the final state of the document, wherein each mutation cluster is replaced by a single, equivalent action geometric modification including the initial state of the document and the final state of the document only, from the selected sequence of mutations of a same class, wherein the same class comprises at least one of a translation class, a rotation class, and a resizing of a specific geometric shape class.

18. The non-transitory, computer readable medium of claim 17, further storing instructions for combining multiple document operations into a cluster to form the proposal based on a contextual purpose for the document operations comprises defining the initial state of the document prior to the multiple document operations and the final state of the document after the multiple document operations.

19. The non-transitory, computer readable medium of claim 17, further comprising instructions for receiving an updated task sequence from the server and undoing in the document a modification from the proposal when the proposal is rejected by the server.

* * * * *